CONTROL UNIT FOR MULTIPLE GRAPHIC AND ALPHANUMERIC DISPLAYS

Filed Aug. 8, 1967 5 Sheets-Sheet 1

INVENTORS
JAMES T. ZAHORSKY
ROBERT J. SIPPEL
RUSSEL J. HOULDIN
BY John B. Osborne
ATTORNEY

CHARACTER GENERATOR MAIN CLOCK

United States Patent Office 3,539,999
Patented Nov. 10, 1970

3,539,999

CONTROL UNIT FOR MULTIPLE GRAPHIC AND ALPHANUMERIC DISPLAYS

Russell Houldin, San Jose, Calif., and Robert J. Sippel, Kingston, and James T. Zahorsky, Saugerties, N.Y., assignors to International Business Machines Corporation, Armonk, N.Y., a corporation of New York

Filed Aug. 8, 1967, Ser. No. 659,122
Int. Cl. G06f *3/14*
U.S. Cl. 340—172.5 12 Claims

ABSTRACT OF THE DISCLOSURE

Graphic and alphanumeric data for each display in a multiple display arrangement is inserted in a unique temporary store and retained an optimum variable length of time under control of unique circuit means responsive to the data source and the common transmission channel.

BACKGROUND OF THE INVENTION

Field of the invention

The invention relates to a multiple alphanumeric and graphic display system for simultaneously displaying several computer generated images on different display devices and more particularly to a display control unit for accepting the computer generated digital images for all of the connected display devices and transmitting the data in its original or altered form where necessary, to the appropriate display device such that each display device can concurrently provide a different image where required by the generated data.

Description of the prior art

Computer controlled alphanumeric and graphic displays have found wide-spread acceptance and use since they provide vastly improved man-machine communication. Such devices have not, however, been fully utilized since they are complicated and therefore costly to manufacture. For example a cathode ray type graphic and alphanumeric displays requires a character generator which in and of itself involves substantial cost and may in many cases remain idle for substantial periods of time.

Multiple display configurations have been constructed where a single computer has supplied appropriate data to each display device. In those instances, the alphanumeric data has been provided in a usable form; thus the computer has performed the function of a character generator. Such systems are exceedingly wasteful of computer time since the character generator can provide a multiline graphic symbol from a single transmission of data from the computer. Such a character generator is shown in copending patent application Ser. No. 436,078 filed Mar. 1, 1965 (now Pat. No. 3,334,304), and assigned to the same assignee as this application. In this character generator, and a byte of data from the computer can generate up to nine successive codes, each of which defines one of nine blanked or unblanked lines comprising a graphic symbol corresponding to the coded byte supplied by the computer. This arrangement substantially reduces the traffic between the computer and the display and the amount of data supplied by the computer.

SUMMARY OF THE INVENTION

Multiple display systems employing a plurality of character generators would, because of cost considerations, be severely limited in use. Straight foreward time sharing of a single character generator between displays would also be unsatisfactory since the number of displays it services without flicker would be severely limited. The limitation stems from the time required to draw the successive lines comprising the symbol on the cathode ray tube. According to the invention, a control unit having a common character generator supplies data defining a single element of a preselected multielement symbol to each of the connected display units in succession as required, so that two or more of the connected displays may be simultaneously generating symbols at all times if the data rate so requires.

DESCRIPTION OF THE PREFERRED EMBODIMENT

Figure 1A:
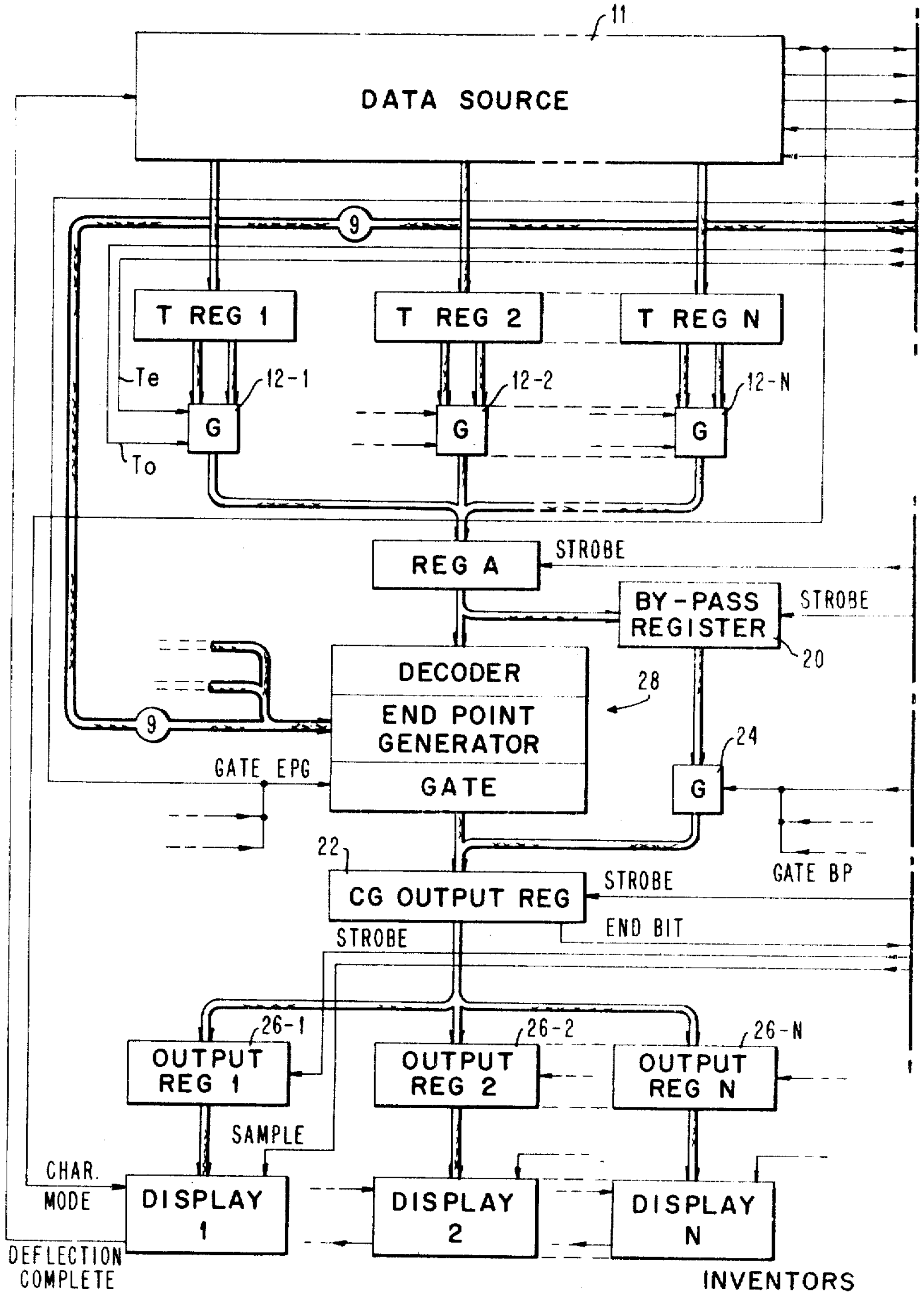
FIGS. 1, 1A and 1B are a block diagram of a control unit constructed according to the invention.
Figure 1:
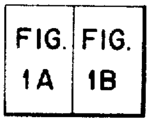
Figure 1B:
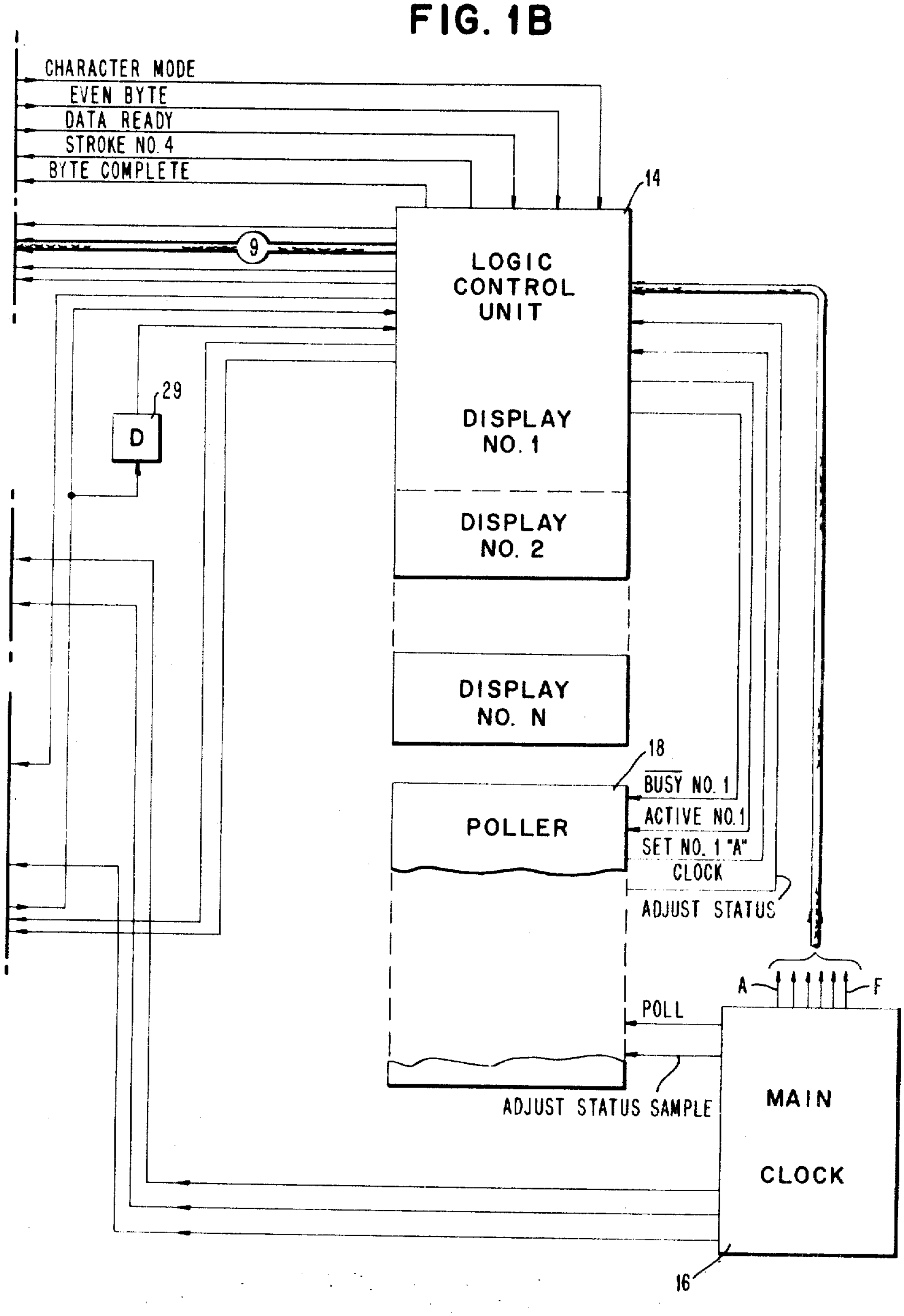

A data source 11 which may comprise a computer, a magnetic core buffer or any other controllable storage source contains digital image data for each of the N displays of the system. The image data for each display is supplied as a variable length sequence of two byte binary coded data words. If alphanumeric symbols are being displayed, each byte defines a symbol having one to nine segments. The byte is decoded and applied to a character generator which supplies in sequence signals defining the required segments. How this is accomplished will be described later. If graphic data is being displayed four bytes or two words of data are required to display a segment of the image. This data is supplied in its entirety by the source and requires four data transfers to the destination display.

The image data for display No. 1 is applied one data at a time to a temporatry register No. 1. The data for display No. 2 is applied to a temporatry register No. 2 and the data for the display No. N is applied to a temporary register No. N. The temporary registers are two bytes wide and the displays can only accept one byte at a time, therefore gates 12–1, 12–2 and 12–N are provided and supply the appropriate byte under control of a pair of signals *Te*1–*Te*N and *To*1–*To*N respectively. The generation of the *8e* and *To* signals will be described latter. The *Te* signals gate the even byte and the *To* signals gate the odd byte.

In addition to the image data supplied to the temporary registers, the data source 11 supplies and receives control signals which control the insertion of data into the temporary register and the movement of the data from the temporary register to the associated display.

Data source 11 provides a "character mode" signal for each display unit when the data in the temporary register for that display is character data. The signal is not provided when the data is graphic data. This signal is applied to the associated display unit so that it will handle the data supplied in the correct manner. Thus when the "character mode" signal is absent, the display accumulates four bytes of image data before attempting a beam deflection whereas with a "character mode" signal, each byte transferred produces a beam deflection. The signal is in addition applied to the appropriate section of a logic control unit 14 for utilization in a manner which will be described later.

Data source 11 provides an "even byte" signal when a word is inserted in the temporary register of each display and receives back a "byte" complete" signal which is used to turn "off" the "even byte signal thus indicating to the appropriate logic control unit that the odd byte in the corresponding temporary register must be passed on. The "even byte" signal indicates that the even byte is to be passed on to the appropriate display.

In addition, the data source 11 provides a "data ready" pulse to each logic control unit for indicating that new data for the appropriate display has been inserted in its temporary register and each logic control unit provides a "stroke number four" signal which is interpreted in graphic mode by the data source as an indication that four related bytes defining a graphic element have been passed on to the appropriate display. A "byte complete" signal is supplied to the data source 11 by each logic control unit when a data byte is passed on to the appropriate display unit.

How these signals are utilized and generated by the logic control unit will be described later in connection with the description of FIG. 3 which is a detailed block digram of the Nth logic control unit.

In the graphic mode, data source 11 transmits data in four byte groups, two bytes at a time to the appropriate temporary register. After the third and fourth byte pair are transferred, the source waits for a "byte complete," "stroke No. 4" and deflection complete before transferring the first and second byte of the next graphic image element to the temporary register. The "deflection complete" signal comes from the display itself and may be generated in many ways. In synchronous systems, it will be a time period equal to the time required to effect the longest deflection. In asynchronous systems, it will be provided when the deflection has been completed.

When the first and second bytes of the next image element are inserted in the temporary register, the source provides a "data ready" pulse and an "even byte" signal to the corresponding section of the logic control unit 14. The "data ready pulse" causes the addressed section of control 14 to go "active" which puts that section in the polling line at the next "adjust status sample" from the main clock 16. In this connection, it should be noted that the section hand enabled a "not busy" condition when it completed transfer of the last byte and actually goes "not busy" at the "adjust status sample" time. The circuits for generating the "not busy" and the "active" signals are illustrated in FIG. 3 and will be described later.

The "not busy" and "active" signals are applied to a poller 18 which provides a "set 'A' clock" signal to the section when the poller determines that the display will get service. The "set 'A' clock" signal starts a local clock in the control section which requires three cycles of the main clock 16 to complete one cycle of the local clock. Signals A–F from the main clock 16 are utilized to implement the local clock function. How this is done will become apparent later. The polling is under control of the main clock 16 which supplies a poll signal to poller 18.

The "even byte" signal from source 11 controls the generation of the T*e* and T*o* signals which operate gates (12–1 to 12–N). At this time the section generates and sends a T*e* to its associated gate to make the even byte in in the selected temporary register available at a register A which is strobed at the appropriate time by the main clock 16 to thus insert the even byte in the A register.

The output of the A register is applied to two parallel paths. One path is for character generation and will be described later; the other is the graphic bypass path and is used for transmission of graphic data. A bypass register 20 strobed by the main clock 16 accepts the data in the A register upon being strobed. The graphic byte in register 20 is applied to a common output register 22 via a gate 24 which is controlled by a "gate bypass" signal from the appropriate section of the logic control unit 14. The data applied to the common output register 22 is strobed into register 22 by a strobe pulse from the main clock 16.

By-pass register 20 is provided to make the time delay in both paths equal. The total transmission delay time from the output of the temporary registers to the input of the output registers 26 is adjusted to equal the maximum deflection time. The polling rate of poller 18 was selected to equal the time delay in the end point generator 28. An equal time was allowed to transfer data from the temporary registers to the generator 28 and to transfer the stroke data from generator 28 to the output registers 26.

Output registers 26–1, 26–2 . . . and 26–N are connected in parallel to the common output register 22 and each is connected to its associated display for supplying the appropriate data to that display. Each section of logic control Unit 14 provides a strobe pulse for controlling entry of data into the corresponding output register 26. In addition, the section provides a sample pulse to the corresponding display to indicate that the next byte of data is available in the connected output register 26.

In the graphic mode, the section of control Unit 14 provides the "byte complete" signal at the same time as the corresponding output register 26 is strobed. In response to this signal, the data source removes the even byte signal which enables the generation of a T*o* signal at the next "set 'A' clock" signal for the display. In addition, another "set data ready" is provided so that the "active" may be generated to enter the poll and the process described above is repeated. After the fourth byte has been processed, as above, the "stroke No. 4" signal is supplied to the data source 11 which waits for a "deflection complete" signal from the corresponding display at which time it inserts two additional bytes into the appropriate temporary register. The third and fourth bytes of the graphic element were previously inserted into the temporary register upon receipt of the "byte complete" and in the absence of both the "even byte" and the "stroke No. 4" which events occurred after transmission of the second byte of the graphic element.

When the data source 11 is supplying alphanumeric data, the data is inserted into the temporary registers 1–N and passed through gates 12–1–12–N under control of unit 14 in the same manner as for graphic data. However, each byte in the temporary registers will be transmitted through the character generator path from one to nine times depending on the configuration of the alphanumeric symbol. This is necessary since the character set requires nine graphic elements to define the entire set and each symbol depending on its configuration will require from one to nine graphic elements to be properly defined.

The output of the A register is applied to a decoder/endpoint generator Unit 28 which may be identical to the decoder, endpoint generator and gate circuit disclosed in the aforementioned application, Ser. No. 436,078. Each section of control Unit 14 includes a counter which keeps track of the character stroke required for its associated display and provides one of nine signals for selecting the appropriate graphic elements on each of the required transfers for each character processed. In addition, each section of Unit 14 provides an "endpoint generator" gate signal at the correct time for making the graphic element generated available to the common output register 22.

An "endbit" signal is provided by the endpoint generator 28 with the last graphic element of a character. The "endbit" signal and a delayed "endbit" signal via delay circuit 29 are applied to Unit 14. The "endbit" signal causes a "byte complete" signal to be transmitted to source 11. This signal is utilized as previously described. The delayed signal is utilized internally and its function will be described later in connection with the description of FIG. 3. In the character mode, the "stroke No. 4" signal is ignored by the data source since it has no significance.

Figure 2:
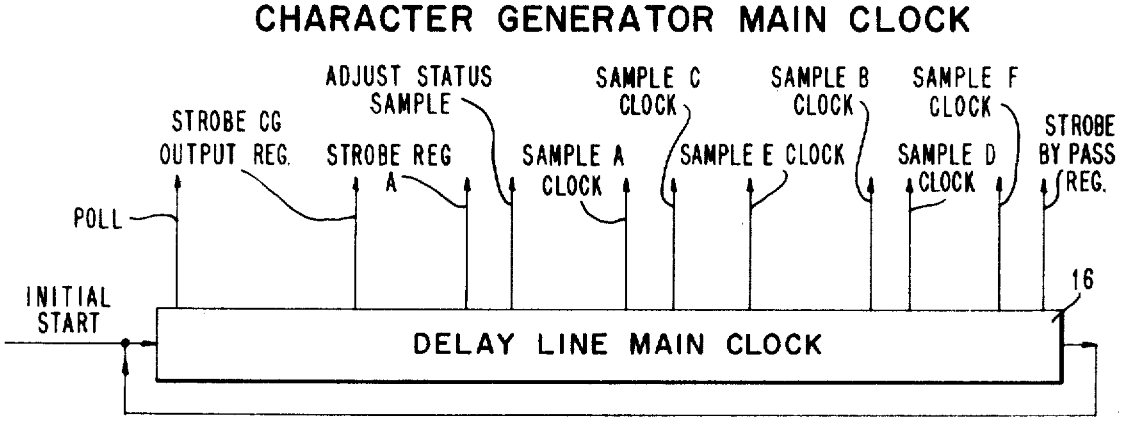
FIG. 2 is a block diagram of the main clock of FIG. 1.

The main clock is illustrated in FIG. 2 and comprises any kind of tapped delay line. The taps are labeled and are substantially in the correct time scale, reading from left to right. In a model the clock was 300 nano seconds long and the output was fed back to the input to achieve continuous running. An initial start pulse was applied to start the clock. No further details have been shown since the clock may take any one of many well known forms as long as the signals with the relative timing illustrated are provided.

Figure 4:
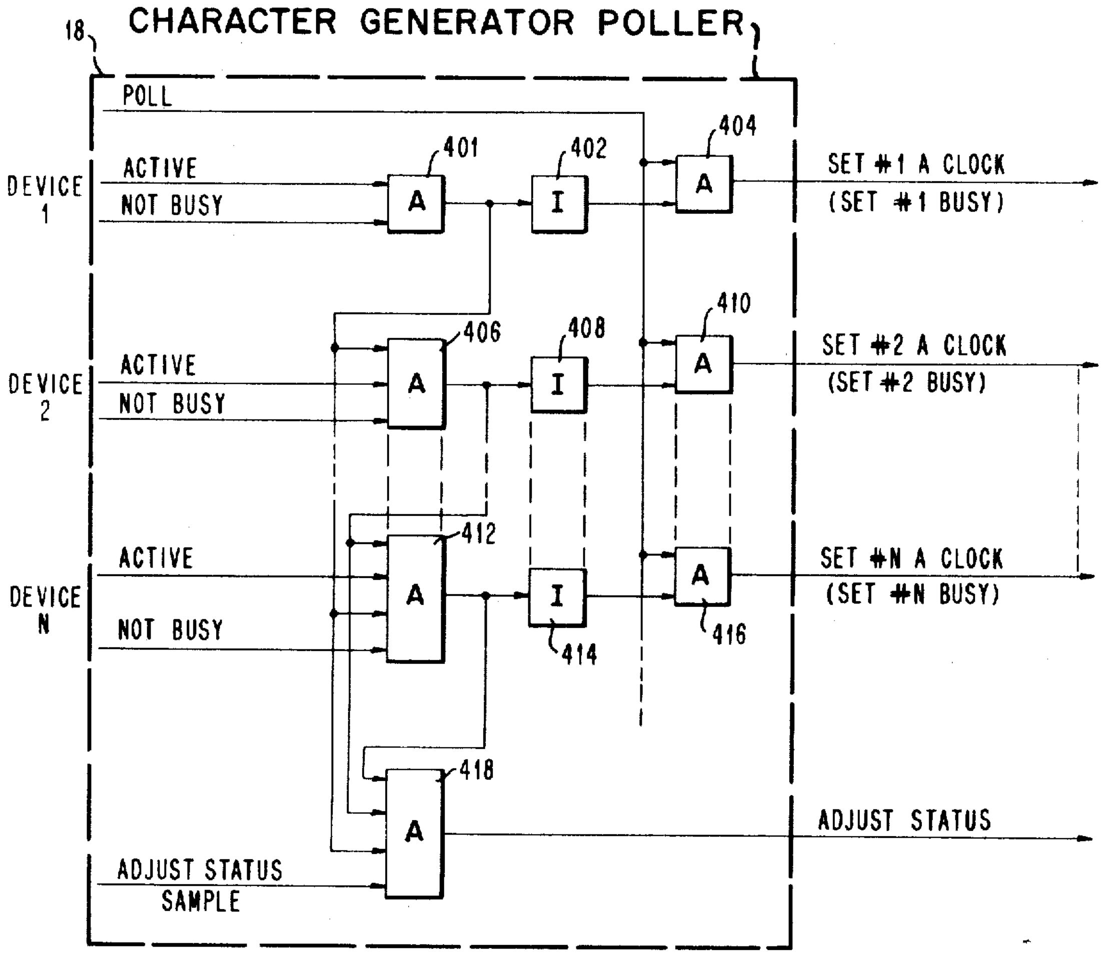
FIG. 4 is a block diagram of polling units shown in FIG. 1.
Figures 3, 3A:
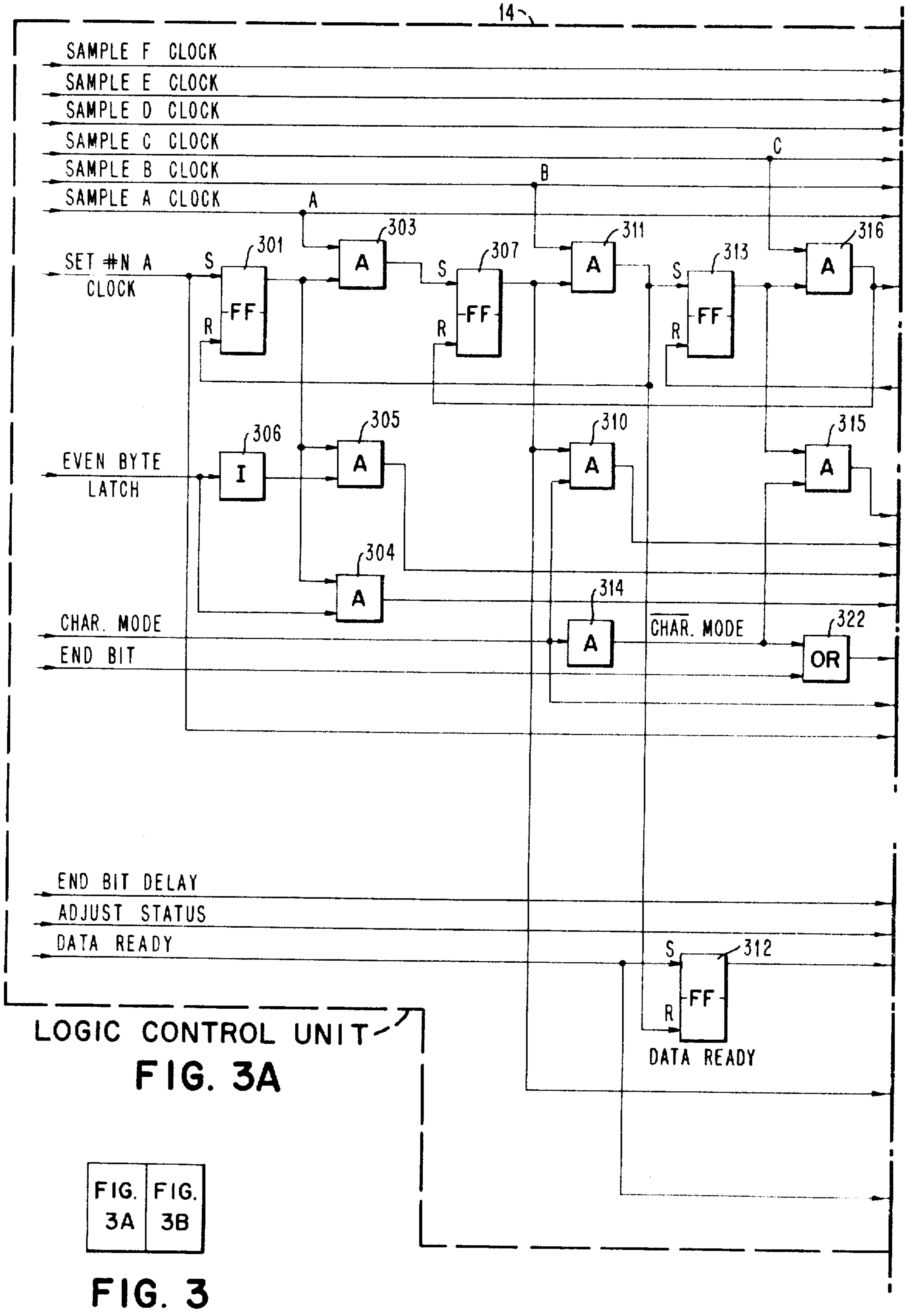
FIGS. 3, 3A and 3B are a block diagram of one of the logic units illustrated in FIG. 1B.
Figure 3B:
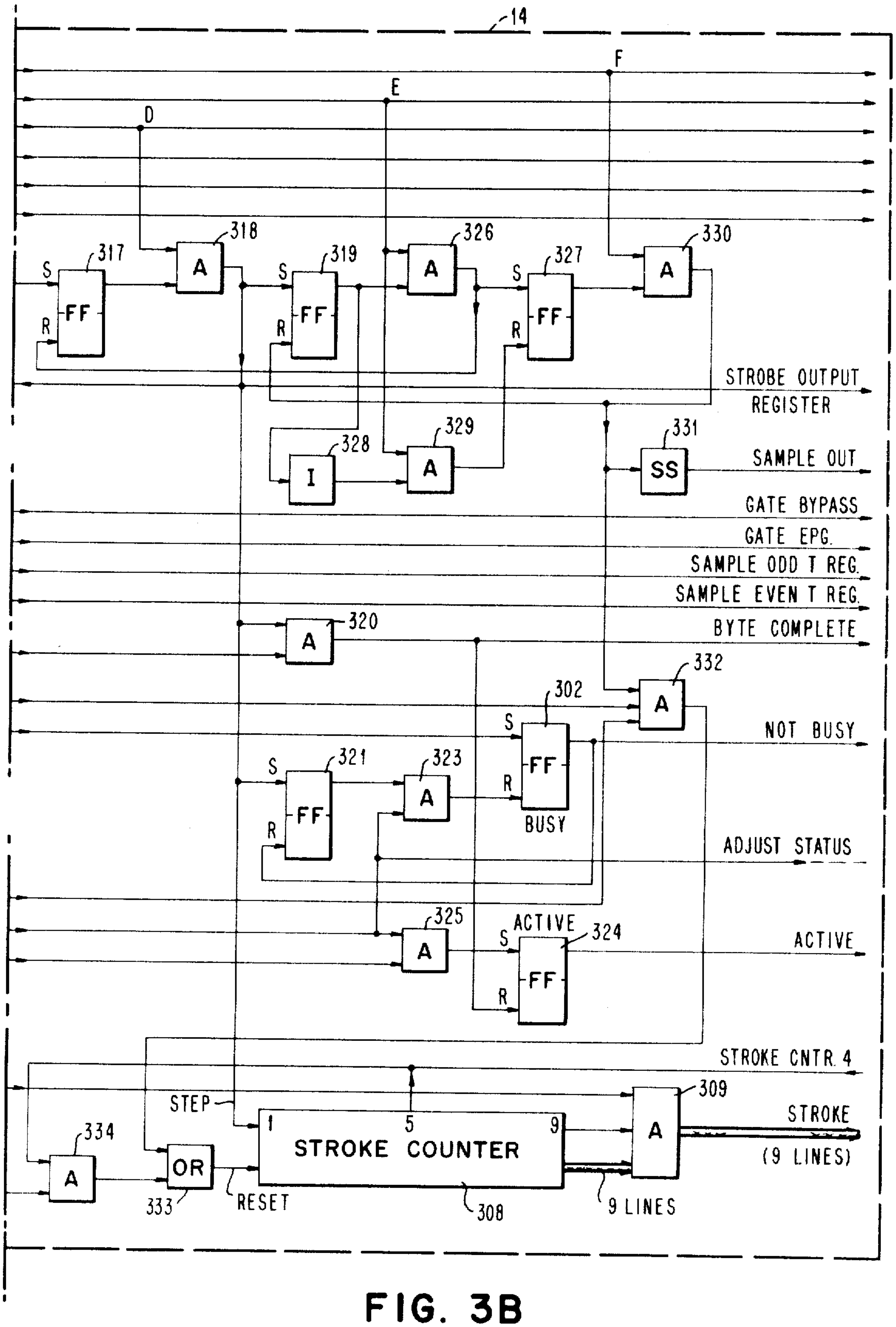

FIG. 3 is a detailed block diagram of one of the N identical sections comprising logic control Unit 14. This section provides a "not busy" and an "active" signal to the poller 18 shown in detail in FIG. 4. These two signals are required before a display will be serviced, i.e. before a data byte will be transferred from the associated temporary register to the display. The "active" and "not busy" signals from the first section of the Unit 14 are applied to an AND gate 401 of the poller 18, FIG. 4. The output developed by gate 401 is inverted by an inverter 402 used to enable an AND gate 404. The "active" and "not busy" signals from the second section are applied to an AND circuit 406, the output of which is applied via an inverter 408 to another AND circuit 410. The "active" and "not busy" "signals from the Nth section are applied to an AND circuit 412 which has its output inverted by a circuit 414 and applied to another AND circuit 416.

The output of circuit 401 is applied to AND circuits 406 and 412 and inhibits the outputs of these circuits when the number 1 section of Unit 14 is both "active" and "not busy" thus the number 1 display is afforded priority over displays 2–N. In a like manner the output of circuit 406 is applied to circuit 412 and inhibits that circuit when section 2 is not busy and active provided section 1 is either busy or inactive.

The poll pulse from the main clock 16 is applied to circuits 404, 410 and 416, only one of which is enable at any given time, and is utilized to set the A clock in the control section associated with the enabled gate. The outputs of gates 401, 406 and 412 are connected to an AND circuit 418 along with the adjust status sample and thus prevent the adjust status condition until all sections of control Unit 14 are either inactive or busy. With this arrangement, the priority provided is limited to one service since no section can become both active and not busy after service until the occurrence of an adjust status.

When a section of Unit 14 is selected for service, the "set 'A' clock" pulse for that section is applied to the set input of a latch 301 and to the set input of a "busy" latch 302. When latch 302 is set, the "not busy" signal applied to the poller 18 is removed and that unit will not be serviced again until the next adjustment status. Latch 301 when set enables an AND circuit 303 and causes the generation of the *Te* or *To* signal via AND gates 304 and 305, respectively, one of which has been previously enabled by the "even byte" signal from the data source 11. If source 11 provides the "even byte" signal AND gate 304 is enabled and provides the *Te* signal when latch 301 is set; if the "even byte" signal is absent, an inverter circuit 306 enables gate 305 to provide the *To* signal when latch 301 is set. AND gate 303 responds to the next "sample 'A' clock" from main clock 16 which follows the setting of latch 301 and passes this "sample A" pulse to set a latch 307.

Each control section includes a counter 308 which has nine stages and nine output lines only one of which provides an output at any given time depending on the state of the counter. After each transfer of a byte, as set forth above, the counter is reset to "one." How this is accomplished will become apparent later. The nine output lines are applied to nine AND gates 309 which are controlled by latch 307. Thus each time latch 307 is set the particular active line of counter 308 is applied to the character generator 28 and causes that circuit to provide a selected stroke of the character designated by the code in the A register. This function is significant in the character mode of operation only. In the graphic mode, the stroke counter data is supplied to the generator 28, however, the meaningless output of the generator is not utilized nor does it affect operation since the generator is not gated in this mode. The output of latch 307 is passed through an AND gate 310 which is enabled during character mode operation and this output is utilized to gate generator circuit 28 as previously described.

The output of latch 307 enables an AND gate 311 when the latch is set. Gate 311 passes the next "sample B" pulse from main clock 16. This pulse is used to reset latch 301 and a latch 312 which was previously set by the "data ready" pulse from data source 11. Latch 312 controls the "active" signal supplied to poller 18 and the details of this function will be described later. In addition, the "sample B" pulse from gate 311 sets a latch 313 which provides an output when set.

The "character mode" signal from data source 11 is inverted by a circuit 314 to provide a "not character mode" or "graphic mode" signal in the absence of the "character mode" signal from source 11. The "graphic mode" signal when available enables an AND gate 315 which provides the "gate bypass" signal when latch 313 is set. Thus, if the data in A register is graphic data. the gate 24 will be operated by the output of gate 315 and the graphic data will be passed to output register 22 unaltered.

Latch 313 enables an AND gate 316 which responds to the "sample 'C' clock" pulse from main clock 16 to set a latch 317 and reset latch 307. Latch 317 enables an AND gate 318 which responds to the "sample 'D' clock" pulse from the main clock 16 to set a latch 319, reset latch 313, provide the strobe for output register 22 and step the stroke counter 308 to its next position. The stroke counter is stepped at this time since the endpoints for the particular strobe, in progress if the data is character mode data, was previously transmitted to the output register 22. If the data is graphic, the counter 308 is utilized as a byte counter and requires stepping since the bypass was previously gated. As previously described, the count of four which is completed when the counter is stepped to the number five position is utilized to signify in the graphic mode that the data for a graphic endpoint has been supplied the connected display and the next data transmission must await a deflection complete. This signal is provided by connecting the fifth stage of counter 308 to the data source via the line labeled "stroke counter 4."

In addition, the output of AND gate 318 is connected to one input of an AND gate 320 and to the set input of a latch 321. AND gate 320 is enabled when graphic data is being transferred by inverter circuit 314 via an OR gate 322 and during character data transfer by the "endbit" from output register 22 via OR gate 322. The output developed at AND gate 320 during the "sample 'D' clock" is the "byte complete" signal transferred to the data source 11. It should be noted that this signal is transferred for graphic data each time a transfer to the connected display occurs, however, in the character mode or "byte complete" signal only occurs after the last required stroke for the character defined by the byte in the 'A' register has been completed. This condition is signaled by circuit 28 with an "endbit" via output register 22.

Latch 321 enables an AND gate 323 which responds to the next adjust status pulse from poller circuit 18 to reset the busy latch 302 and provide the "not busy" signal which is used to reset latch 321 and as previously described. With this arrangement, the busy latch 302 is reset to the "not busy" state upon completion of each transfer to the connected display to provide one of the two conditions required to enter the poll. The "active" signal, the other required signal for entering the poll, is provided by a latch 324 which is set by the "data ready" pulse via latch 312 and the adjust status from source 11. Concurrence of these signals is determined by an AND gate 325 which has its output connected to the set input of the active latch 324. Active latch 324 is reset by the "byte complete" signal, therefore, the "active" signal once provided remains until the byte has been transferred in the graphic mode or the endbit has been provided in the character mode. It should be noted that the active latch 324 remains set during character data transfer, even though the data ready latch 312 is reset upon the transfer of the first stroke of the character in the A register, and is not reset until the endbit signifying the last stroke is provided as previously described.

The output of latch 319 when set enables an AND gate 326 which passes the next "sample 'E' clock" pulse from main clock 16. This pulse sets a latch 327 and resets latch 317. In addition, the output of latch 319 is applied to an inverter 328 which enables an AND gate 329 whenever the latch 319 is reset. AND gate 329 passes the "sample E" pulse following the "sample E" pulse which sets latch 327 for resetting latch 327. This will occur somewhat later in time and the reasons for this will become obvious as the description continues.

Latch 327 enables an AND gate 330 which passes the "sample 'F' clock" pulse from main clock 16. This pulse resets latch 319 enabling AND circuit 329 via inverter 328 as described above, activates a single shot circuit 331 to provide the "sample out" pulse for the connected display and in character mode only, resets the stroke counter 308 via and AND circuit 332 (if it is *last stroke*) and an OR gate 333. In the graphic mode stroke counter 308 is reset by the "data ready" pulse from data source 11 via an AND gate 334 enabled by the "stroke counter 4" signal derived from the counter 308.

As previously pointed out, the local clock (latches 301, 307, 313, 317, 319 and 327 and sample A–F clock pulses) requires three complete cycles of the main clock 16. How this is accomplished can be seen by the relative timing of the sample pulses from the main clock shown in FIG. 2.

The sample A and B pulses for a selected section, i.e. a section selected by a "set 'A' clock" pulse, are effective during the first main clock cycle following the selection pulse. None of the other sample pulses are effective during this cycle since the "sample 'C' clock" precedes the "sample 'B' clock." However, on the next cycle of the main clock, the "sample 'C' clock" and "sample 'D' clock" are effective and "sample 'F' clock" are effective in the third cycle of the main clock.

This arrangement permits three units or sections to operate simultaneously. The first selected completes A and B before the second starts and executes C and D while the second is provided with A and B.

The first unit in the third main clock cycle completes a full cycle of local clock operation with the E and F while the second unit is provided with C and D and the third with A and B. Buffering between the data for any three selected displays is provided by the A register, generator 28 and bypass register 20 depending on the type of data and output register 22 along with the corresponding strobe and gate pulse previously described.

While the invention has been particularly shown and described with reference to a preferred embodiment thereof, it will be understood by those skilled in the art that various changes in form and details may be made therein without departing from the spirit and scope of the invention.

What is claimed is:

1. Control means for transferring image data from a plurality of storage devices in time sequence to a plurality of corresponding display units comprising:

a transmission path connected to said storage devices for receiving the data to be transferred and including in a common portion thereof an asynchronous character generator for providing a predetermined number of time sequential endpoint coordinates in response to coded data and a stroke count supplied thereto, said generator also providing a unique signal with the last endpoint coordinates of the sequence, a plurality of control units each unique to one display and including, counter means connected to the character generator and responsive to data transfers through said transmission path for its associated display unit for registering a predetermined number of successive transfers as determined by the data, the output of said counter providing the stroke count for associated data in the said character generator, and means responsive to the unique signal characterizing the last endpoint for associated data for resetting said counter means, and polling means connected to and responsive to each of said control units for rendering one control unit at a time active for transferring one set of endpoint coordinates with each activation whereby the individual elements comprising the characters to be displayed are made available for display on an interleaved basis.

2. A control means as set forth in claim 1 in which said polling means includes a cyclic clock means having a cyclic rate which is a fractional part of the longest deflection time for a single character element.

3. Control means as set forth in claim 1 in which said polling means includes a cyclic clock having a period which is a fractional part of the delay time of the transmission path.

4. A control means as set forth in claim 2 in which the transmission path passes a data element for the display in substantially the same length of time required by the display to effect the longest deflection for a single character element.

5. A control means as set forth in claim 3 in which each control unit includes a cyclic clock synchronized by the poller clock and has a cycle time equal to the transit time for data through the transmission path.

6. A control unit for connecting a data source to a plurality of display devices each of which may display different images comprising:

a plurality of temporary storage means each for receiving data from the source for one unique display, a transmission path connected to said temporary storage means, said path including in a common portion thereof an asynchronous character generator for providing a predetermined number of time sequential endpoint coordinates in response to coded data and a stroke count supplied thereto, a plurality of storage means each unique to one display connected to said transmission path for receiving the data from said common transmission path, a plurality of control means each unique to one display and each including counter means for registering a predetermined number of successive data transfers for its unique display through the transmission path, each said control means including first means connected to its associated temporary store for applying the data contained therein to the transmission path, second means connecting the counter means to the character generator for supplying the stroke count to the generator, and third means connected to the associated receiving storage means for controlling transfer of the endpoint coordinates generated by the character generator to the associated receiving storage means, and polling means connected to and responsive to each of said control units for rendering one control unit active at any given time for causing the transfer of data by the said control signals as set forth and the application of the attained value of the counter means to the character generator in the transmission path whereby one of the successive endpoint coordinates of the character defined by the data in the associated temporary storage means are provided to the associated receiving storage means each time the control means is selected by the polling means.

7. A control means as set forth in claim 6 in which said polling means includes a cyclic clock means having a cyclic rate which is a fractional part of the longest deflection time for a single character element.

8. Control means as set forth in claim 7 in which said polling means includes a cyclic clock having a period which is a fractional part of the delay time of the transmission path.

9. A control means as set forth in claim 7 in which the common transmission path passes a data element for the display in substantially the same length of time required by the display to effect the longest deflection for a single character element.

10. A control means as set forth in claim 9 in which each control unit includes a cyclic clock synchronized by the poller clock and has a cycle time equal to the transit time for data through the common path.

11. Control means for transferring image data from a plurality of storage devices in time sequence to a plurality of corresponding display units comprising:

a transmission path connected to said storage devices for receiving the data to be transferred and including in a common portion thereof an asynchronous character generator for providing a predetermined number of time sequential endpoint coordinates in response to coded data and a stroke count supplied thereto, a plurality of control means each unique to one display and each including counter means connected to the character generator for registering a predetermined number of successive data transfers for its unique display through the transmission path, each said control means providing control signals for applying the data in its associated storage device to the transmission path, and polling means connected to and responsive to each of said control units for rendering one control unit active at any given time for causing the transfer of data from the associated storage device to the transmission path and the application of the attained value of the counter means to the character generator in the transmission path whereby one of the successive endpoint coordinates of the character defined by the data in the selected storage means is provided at the output of the transmission path each time the control means is selected by the polling means.

12. A control unit for connecting a data source to a plurality of display devices each of which may display different images comprising:

a plurality of temporary storage means each for receiving data from the source for one unique display, a transmission path connected to said temporary storage means, said path including in common portion thereof an asynchronous character generator for providing a predetermined number of time sequential endpoint coordinates in response to coded data and a stroke count supplied thereto, said generator also providing a unique signal with the last endpoint coordinates of the sequence defining the character specified by the coded data, a plurality of storage means each unique to one display connected to said transmission path for receiving the data from said transmission path, a plurality of control means each unique to one display and each including counter means for registering a predetermined number of successive data transfers for its unique display through the transmission path, each said control means including first means connected to its associated temporary store for applying the data contained in the temporary store to the transmission path, second means connected to the associated receiving storage means for causing transfer of the endpoint coordinates generated from the data in associated temporary storage to the associated receiving storage means, and third means connected to the character generator and responsive to the unique signal characterizing the last endpoint coordinates for associated data for resetting said counter means, and polling means connected to and responsive to each of said control units for rendering one control unit active at any given time for causing the transfer of data by the said control signals as set forth and the application of the attained value of the counter means to the character generator in the common portion of the transmission path whereby the successive endpoint coordinates of the character defined by the data in the associated temporary storage means are provided to the associated receiving storage means each time the control means is selected by the polling means.

References Cited

UNITED STATES PATENTS 3,307,156 2/1967 Durr ------------- 340—172.5
3,323,119 5/1967 Barcomb et al. ------- 340—324
3,438,001 4/1969 Langtry et al. ------ 340—172.5
3,453,384 7/1969 Donner et al. -------- 178—6.8

RAULFE B. ZACHE, Primary Examiner

U.S. Cl. X.R.

340—324